United States Patent [19]

Tardif et al.

[11] Patent Number: 4,626,217
[45] Date of Patent: Dec. 2, 1986

[54] BROADBAND DOPPLER SIMULATOR

[75] Inventors: Arthur J. Tardif, Amherst, N.H.; Samuel D. Anthony, Tiverton, R.I.

[73] Assignee: Raytheon Company, Lexington, Mass.

[21] Appl. No.: 490,929

[22] Filed: May 2, 1983

[51] Int. Cl.$^4$ .............................................. G09B 9/06
[52] U.S. Cl. ........................................... 434/8; 434/9
[58] Field of Search ...................... 434/6, 7, 8, 9, 1, 2, 434/10; 367/87–90, 904; 343/5 DP, 5 FT

[56] References Cited

U.S. PATENT DOCUMENTS

| | | | |
|---|---|---|---|
| 3,642,999 | 2/1972 | Murphree | 434/7 |
| 3,916,533 | 11/1975 | Kijesky | 434/9 |
| 4,316,269 | 2/1982 | Van't Hullenaar | 367/904 |

Primary Examiner—Thomas H. Tarcza
Assistant Examiner—Bernarr Earl Gregory
Attorney, Agent, or Firm—Martin M. Santa; Richard M. Sharkansky

[57] ABSTRACT

A broadband doppler simulator is described in which signals from a plurality of hydrophones are simulated by selecting storage addresses of a random access memory whose successive addresses contain samples of an input signal. The range of each hydrophone from the target whose signal it is receiving is determined by the address assigned to the hydrophone relative to the address of the input signal in the random access memory. In order to produce a doppler shift (time compression/expansion), the address of the simulated hydrophone signal is changed with respect to the signal which is being stored in the memory. The rate at which the address of the simulated hydrophone signal is being changed relative to the input signal determines the doppler shift. In order to reduce the size of the random access memory while retaining the ability to change the apparent doppler shift with a higher resolution as well as maintain signal distortion below an acceptable limit, an interpolation technique is used to obtain signals corresponding to delays which are smaller than the delay between adjacent addresses.

4 Claims, 7 Drawing Figures

BROADBAND DOPPLER SIMULATOR

BACKGROUND OF THE INVENTION

This invention relates to apparatus for the simulation of the acoustic signature produced by a moving vessel received at several receiver locations, each at a different range and bearing to the vessel. Each of the simulated signals must provide a time delayed replica of the vessel's signature corresponding to its range from the receiver, its doppler shifted signature, and its amplitude which reflects the propagation path loss. The time delay is necessary because a maneuver by the vessel which changes its acoustic signal will arrive at the different receivers delayed by the propagation times. The time difference between received signals at the receivers can be used to localize the source. Separate doppler shifts are required because the vessel's velocity will be projected at different angles along the propagation paths to the receivers. The differential doppler shifts can also be used to localize the vessel location relative to the receivers. Finally, the vessel's signature will experience different propagation conditions along the paths to the receivers. Relative signal levels can be used to localize the signal source.

A direct approach to providing simulated signals, which has been used in the past, is to synthesize a separate signature for each receiver. Maneuvers appearing in the signature can be synthesized with the correct time delay. Also, separate doppler shifts and propagation path losses can be applied. Difficulty arises when time delays between random variations within the signature are implemented. Accurate control of these time delays is very difficult. The prior art implementation also requires a synthesizer for each receiver signal being synthesized (there may be as many as eight receiver signals being synthesized simultaneously) at great hardware expense and marginal simulation fidelity.

In contrast, it is an object of the approach employed in this invention to produce the synthesized receiver signals by modeling the physical phenomena as depicted in FIG. 1. An acoustic source 1 generates the signal waveform f(t) produced by the vessel. This waveform is stored in a delay medium for propagation delay storage 2. Access for each receiver is provided to variable delay points within the delay storage 2. By "constantly" varying the delay as a function of range from source to receiver, not only is a delayed replica of the source signal generated, but also a doppler shift or time compression/expansion is produced. The strength of the simulated signal of each receiver is determined by the path loss attenuator 3 in each receiver channel. The process of this invention is exactly the physics of the propagation phenomenon and is not the same as reading out a signal at a faster or slower rate than it was written in. The prior art differential rate technique works well with time limited signals. However, a queuing problem develops when it is applied to continuous signals. This invention does not have a queuing problem since the simulator reads out delayed, doppler-shifted signals at the same rate that they are written in.

In a practical implementation of the invention, there will be a finite resolution to the constantly varying time delay. There are two types of quantization to be considered. First, the value of available time delays will be quantized. Second, the rate at which the time delays are varied will also be quantized. These two quantizations are interrelated in an analogous way as amplitude quantization, and sampling times are related in a normal analog-to-digital converter. The effect of the time delay parameters on the quality of the signal synthesized in one channel is considered.

Spectral analysis has determined that a sinusoidal input signal f(t) with a constant range rate will provide a usable synthesized signal at the doppler frequency if the time delay is updated at least twice during each period of the doppler frequency shift.

SUMMARY OF THE INVENTION

Apparatus for the simulation of the acoustic signature of a maneuvering vessel as it is received at several receiver locations, each at a different range and bearing with respect to the vessel is obtained by providing a delayed replica of the vessel signature, a doppler shifted signature, and an appropriate propagation path loss for the receiver locations. The simulation system synthesizes a separate signature for each receiver. One acoustic signature source generates the signal waveform which is sampled and stored in a delay medium, such as a random access memory. Access for each receiver signal is provided to variable delay points within the overall delay available in the random access memory, the delay selected being representative of the range of the target signal generator from the signal detector. Change in range resulting in a doppler shift (time compression/expansion) is accomplished by obtaining delayed signals from a group of adjacent delay taps of the delay line, and multiplying each signal by an appropriate weighting factor, and summing these weighted signals together. The weighting factor is changed at the sampling rate at which signals are being stored in the delay line, and thus by appropriate choice of weighting factors the apparent signal is caused to move in its relative delay in correspondence with the manner in which the weighting factors are changed. The signals from the selected group of taps of the delay medium are accumulated to provide a sampled signal of the delayed and doppler shifted simulated signal at the output of the accumulator for each set of weighting factors. The succession of these simulated signals, each occurring at the same rate as the signals being provided to the storage medium provide the delayed, doppler shifted signal which is simulating the signal received at one of the receivers.

BRIEF DESCRIPTION OF THE DRAWINGS

The aforementioned objects and other features of this invention are explained in the following description taken in conjunction with the accompanying drawings, wherein.

DESCRIPTION OF THE PREFERRED EMBODIMENT

Figure 1:
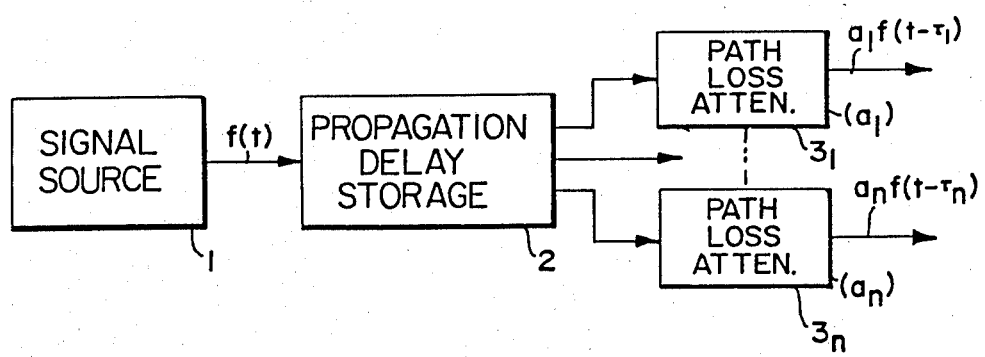
FIG. 1 is a block diagram representing the method used in the invention for the generation of a plurality of doppler shifted, range-delayed signals.
Figure 2:
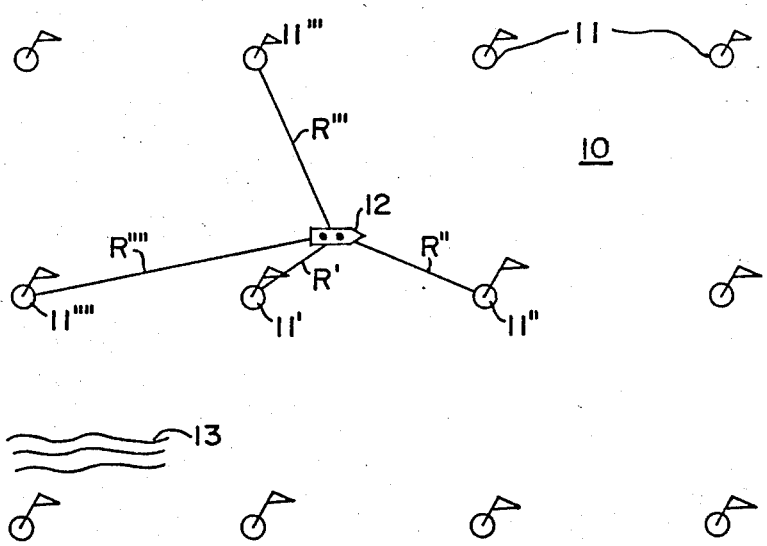
FIG. 2 depicts a field of hydrophones where doppler-shifted, range-delayed signals received from a common source are to be simulated by the apparatus of this invention.

Referring to FIG. 2, there is shown a sonobuoy field 10 of hydrophones 11, each of which detect a signal generated by the vessel 12 by its motion through the water 13. The signals from the hydrophones 11 are transmitted by a surface transmitter which is connected to the hydrophone. The signal received by each hydrophone 11 will differ from the signal received by the other hydrophones of the field 10 by the range R of the hydrophone 11 from the vessel 12 and by the doppler shift (time compression/expansion) of the received signal which will differ according to the rate at which the vessel is approaching or receding from the particular hydrophone 11 whose signal is being considered. The magnitude of the signal received by each hydrophone 11 is also dependent upon its particular range R from the vessel 12. It is an object of this invention to simulate the signal received by an appropriate number of hydrophones 11 in a field 10 by providing realistic broadband doppler simulations as part of the trainer system.

Figure 3:
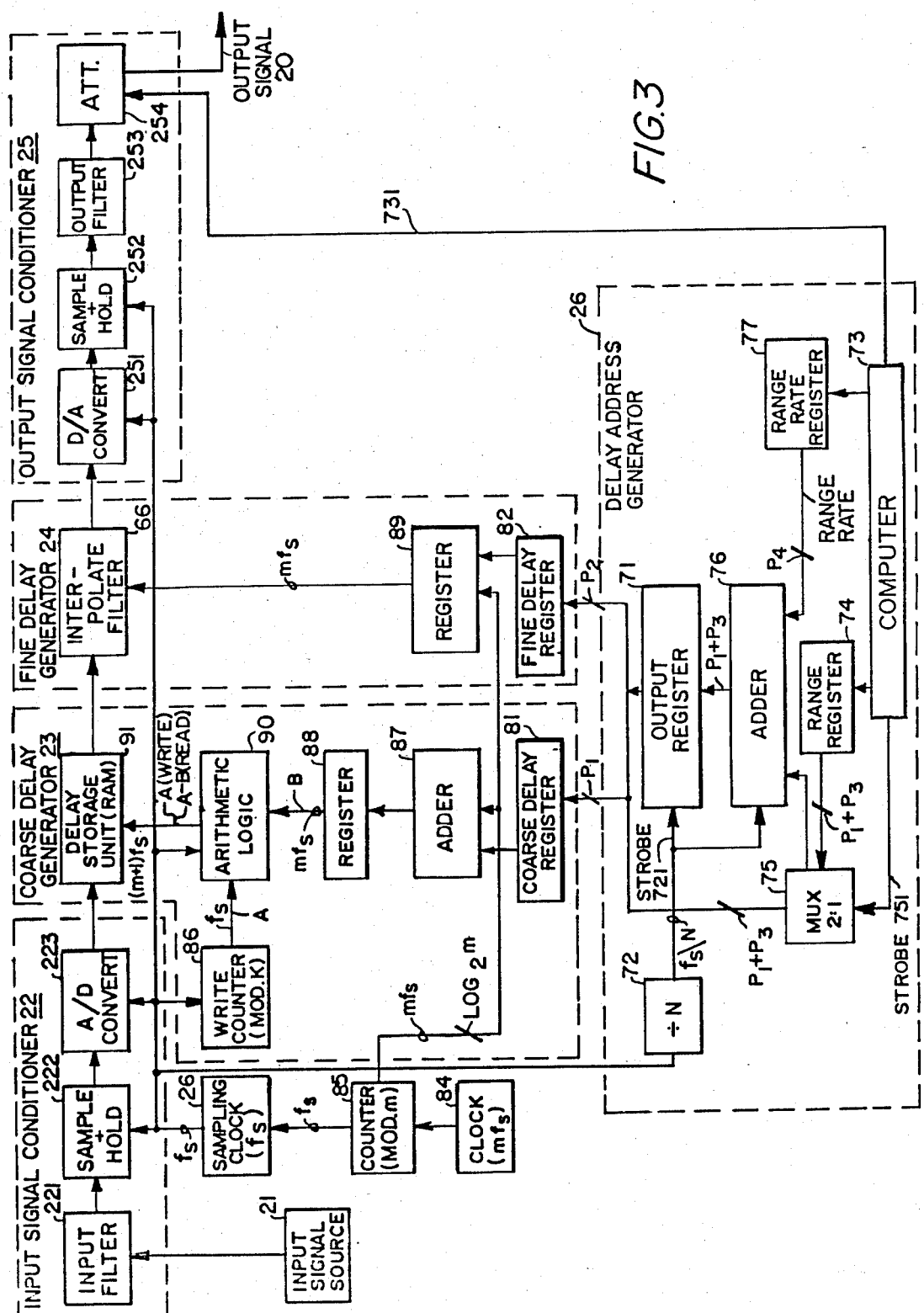
FIG. 3 is a block diagram of a preferred embodiment of the invention for producing a single doppler-shifted, range-delayed hydrophone signal.

A block diagram of an embodiment of the invention for a single channel is shown in FIG. 3. There are three major functions involved in the simulator: The Delay Address Generator 26, the Coarse Delay Generator 23, and the Fine Delay Generator 24. The design example parameters chosen for discussion are: a low pass signal, $f(t)$, of 0 to 2048 Hz from source 21; a maximum time delay of 8 seconds, a sampling rate $f_s$ of 8192 Hz, and a range rate from 0 to 90 knots in less than 0.02 knot steps. The Coarse Delay Memory 91 length is then selected to be: $2^{16}=65,536$ addresses (the maximum time delay multiplied by the sampling rate). Fine time delays are created intermediate to those delays provided at the addresses of memory 91 and are generated by interpolation in filter 66 from the coarse delay samples obtained from the memory 91. The delay addresses, both coarse and fine, of registers 81, 82, respectively, are obtained by accumulating delay increments, which are proportional to range rate from range rate register 77, into delay addresses proportional to range.

The Delay Address Generator 26

The computer 73 is position keeping with respect to the receiver the vessel whose signal $f(t)$ is to be simulated as it would appear at the receiver. At periodic intervals (e.g. one quarter second to one second) the computer provides updated values of the vessel's range and range rate to registers 74 and 77, respectively. Constant range rate is assumed between updates. Range rate is thus accumulated into range at the output of delay address generator 26. Any error with respect to the range, provided with the assumption of constant range rate, is corrected by the periodically updated range value from the computer.

There are four word lengths (in bits) used in the delay address generator 26: P1 is the number of bits in the coarse delay address; P2 is the number of bits in the fine delay address; P3 is the number of the least significant bits needed in concatenation with P1 to resolve the minimum time delays required at minimum range rate; and P4 is the number of bits required to encompass the desired maximum range rate given the minimum range rate (P3 value).

P1 is determined from the sampling rate $f_s$ and the total time delay $T_{max}$ (range) required.

$$P1 \geq \log_2(T_{max} \cdot f_s)$$

For $f_s=8192$ and P1=16 bits, $T_{max}=8$ seconds.

P2 is determined by the time delay resolution required at maximum range rate $\dot{R}_{max}$ and maximum signal frequency $f_{max}$ to provide acceptable performance (maximum allowable distortion).

$$P2 \geq -\log_2(\dot{R}_{max} \cdot N/C)$$

where $N=\Delta T_{min} \cdot f_s$, C=the velocity of sound in water (e.g. 4850 ft/sec); $\Delta T_{min}$=update time interval (minimum of two updates each period of maximum simulated doppler shift) $<1/(\dot{R}_{max}/C) \cdot 2f_{max}$; and delay resolution$=(\dot{R}_{max}/C)/\Delta T_{min}$.

Table 1 shows a range of P2 as a function of N for $\dot{R}_{max}=90$ knots. This table is not exhaustive of possible values of the parameters shown.

P3 is determined by the minimum time delay increment needed to implement the minimum range rate $\dot{R}_{min}$.

$$P3 \geq -\log_2(\dot{R}_{min} \cdot N/C)$$

Table 1 lists the integer values of P3 as a function of N for $\dot{R}_{min} \leq 0.02$ knots.

P4 is determined by the value of $\dot{R}_{min}$ resulting from the selection of P3 and $\dot{R}_{max}$.

$$P4 > \log_2 \dot{R}_{max}/\dot{R}_{min}$$

The minimum required integer value of P4 along with the resulting values of $\dot{R}_{max}$ and $\dot{R}_{min}$ are shown in Table 1.

Figure 4:
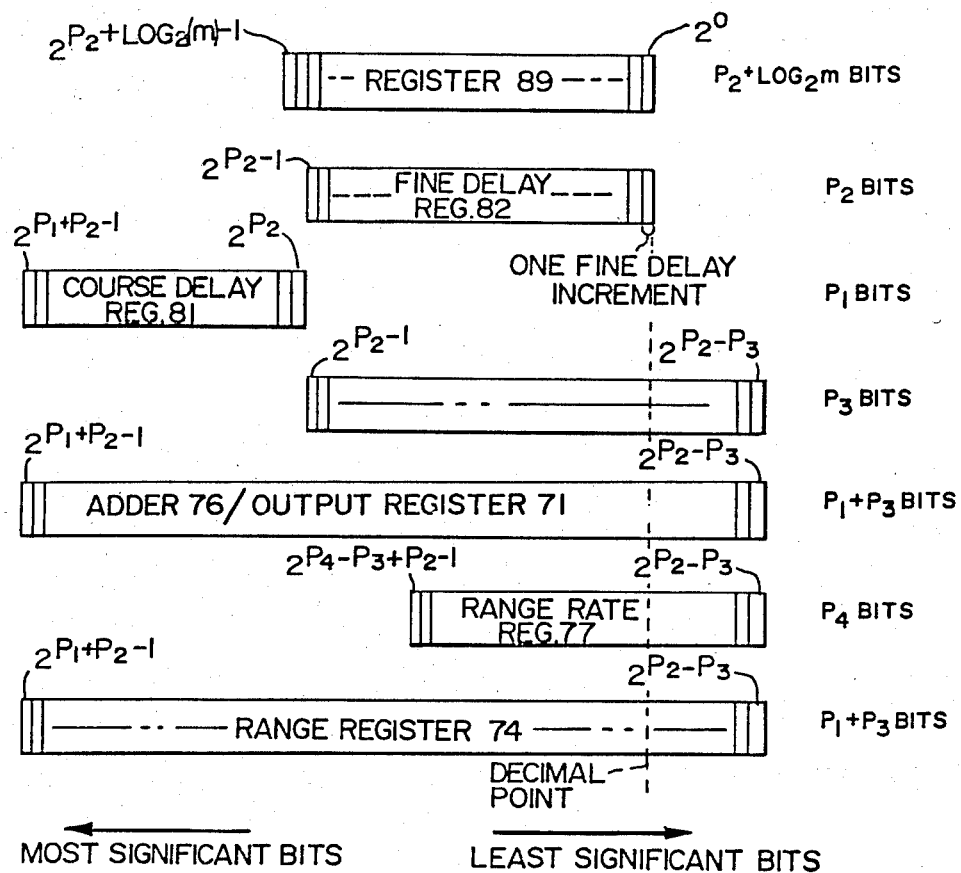
FIG. 4 shows the word lengths and the numerical values of the words at the outputs of different functional blocks.

The bit lengths P1, . . . , P4 on various data lines are shown along with the frequency at which the data is incremented in FIG. 3. FIG. 4 shows the word lengths in terms of the P bits and the resulting numerical values of the outputs of different registers and adders.

TABLE 1

| | Delay Address Generator Word Lengths | | | | |
|---|---|---|---|---|---|
| N | P2 | P3 | P4 | $\dot{R}_{min}$ | $\dot{R}_{max}$ |
| 1 | 5 | 18 | 13 | .0110 | 90.1 |
| 6 | 3 | 15 | 13 | .0146 | 119.6 |
| 13 | 2 | 14 | 13 | .0135 | 110.6 |
| 32 | 0 | 13 | 13 | .0110 | 90.1 |

The Coarse Delay Generator 23

The Coarse Delay Generator 23 uses a conventional RAM memory 91 technique for a delay device. Sampled data from signal conditioner 22 is stored in successive locations of memory. Each sampling interval $1/f_s$, causes the write address A from counter 86 to increment by one. Delayed sampled signals are accessed with respect to the write address A by subtracting the desired delay B from the write address to obtain a read address A-B. A read of samples from each of m addresses about the read pointer address A-B are retrieved to be used in the interpolation filter 66 to create a sampled signal whose value corresponds to a signal sampled at the fine time delay required. The delayed sampled signal of filter 66 is outputted at the same rate as the signal is inputted, that is, at the sampling rate $f_s$.

The Fine Delay Generator 24

Figure 5:
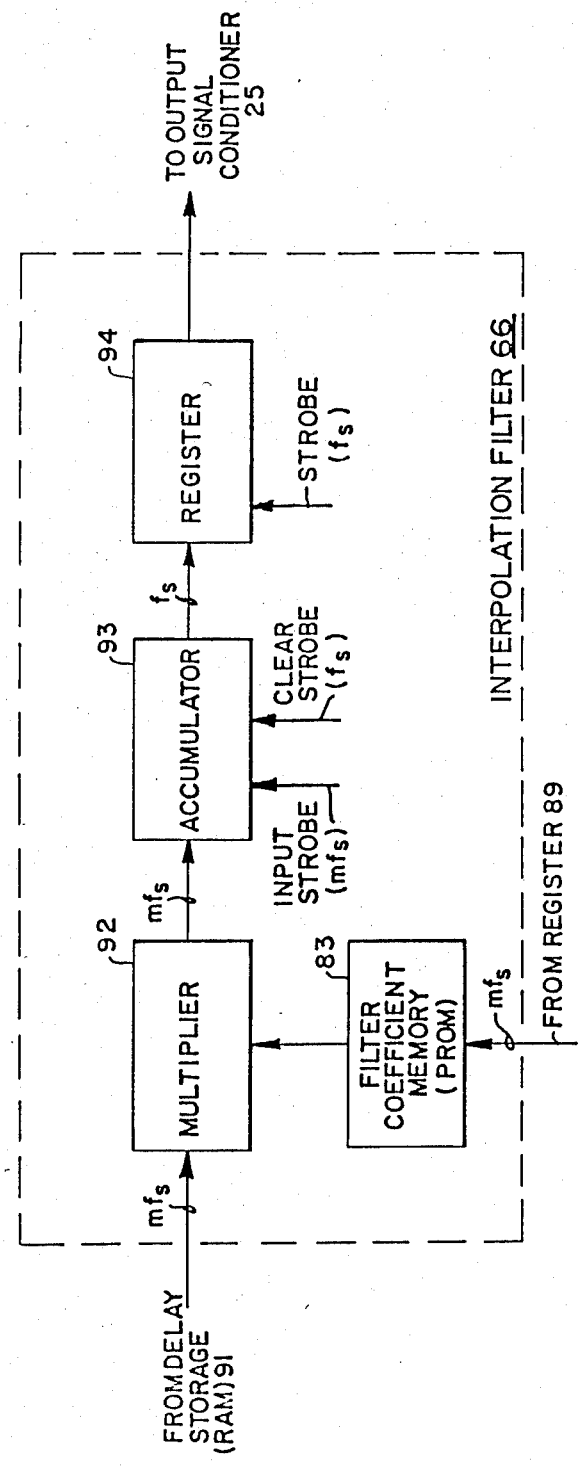
FIG. 5 is a block diagram of the interpolator of FIG. 3.

The last major function in the Doppler Simulator is that provided by the Fine Delay Generator 24. It can be seen from Table 1 that time delays much finer than one sampling interval $1/f_s$ need to be generated. For example, at the highest update rate (N=1) as many as $P_2=5$ bits of fine delay address from register 82 are required to resolve the time delay. Hence, an interpolation filter 66 is used to compute the values of the sampled signals at delay times which are intermediate to the RAM 91 address delay times. FIG. 5 shows a sample filter which utilizes m tap weights per calculation. A total of $m \cdot 2^{P_2}$ coefficients are stored in memory 83, giving the capability of interpolating to $2^{P_2}-1$ intermediate time delays. The filter 66 is an m tap finite impulse response (FIR) filter which utilizes the RAM delay memory 91 directly for its storage. Hence, by simply accessing the desired delayed m samples from the RAM delay memory 91, no additional signal storage is required in the filter. Note that the interpolation filter shown in FIG. 5 introduces a time delay bias of one half the filter impulse response time. This bias can be eliminated by making m odd and offsetting the coarse delay address by the integer part of m/2.

Referring again to FIG. 3, there is shown a system capable of producing an output signal 20 whose time delay and time compression/expansion (doppler shift) correspond to those of a signal received from a vessel 12 by one of the hydrophones 11. A continuous input signal source 21 provides a signal having a signature typical of a signal which would emanate from a vessel 12. The signal from source 21 is provided to an input signal conditioner 22 to sample the signal for storage in the delay storage unit 91 of the coarse delay generator 23. A selected group of sampled delayed signals from the delay storage unit 91 are provided in time sequence to the fine delay generator 24 which contains an interpolation filter 66. Filter 66 selectively weights each delayed signal and provides a resultant summed signal which is shifted in delay by a prescribed amount relative to the group of signals received from the delay storage unit 91. Changing the weighting distribution changes the amount of effective delay. The coarse and fine delay address signals provided to storage unit 91 and the interpolation filter 66, respectively, determine the delayed signals and weighting factors which are formed from the coarse and fine delay signals received from the delay address generator 26. The signal output from the fine delay generator 24 is provided to the output signal conditioner 25 whose output is the signal 20.

Figure 6:
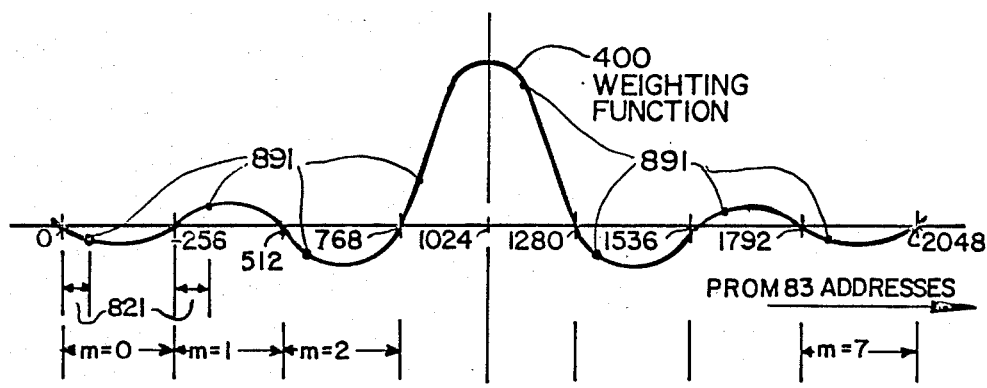
FIG. 6 is a graph depicting the stored values of weighting factors as a function of the addresses in the memory of the interpolator of FIG. 5.

The manner in which the units described above function to provide a doppler shifted signal at a prescribed range is shown by providing a more detailed description of the operation of the circuit of FIG. 3. A single input broadband signal is provided by input signal source 21 where it is conditioned in input signal conditioner 22 by bandwidth limiting in input filter 221 after which the signal is sampled and held in sample and hold circuit 222 at a sampling rate $f_s$ by a clock pulse from sampling clock 26. The analog output signal of the sample and hold circuit 222 is converted to a digital signal in the A/D converter 223. The resulting serial sequence of digital signals provided by converter 223 is stored in the random access memory (RAM) 91 at successive address locations. The write address "A" is provided to RAM 91 by the arithmetic logic unit 90 which has the write address "A" provided to it by the write counter 86. Write counter 86 is incremented at the sample clock frequency $f_s$ and is a modulo K counter, K being the number of addresses of the RAM storage unit 91 (i.e. $K=2^{P_1}$). Thus, the digital signal from converter 223 is stored in RAM 91 whose write address is incremented at the sampling frequency $f_s$ rate. The sampling clock frequency $f_s$ is at least twice the frequency of the highest frequency of interest provided by the filtered signal source 21. In the time interval between successive "write" addresses occurring at the $f_s$ rate, the arithmetic logic unit 90 also provides a sequence of a group of adjacent read addresses to RAM 91 for providing delayed signals to the fine delay generator 24. This group of adjacent delayed values will be weighted and summed by the fine delay generator 24 such that a new delay sample is created that represents part of the desired doppler shifted replica of the input signal source 21. In order to produce a doppler shifted delayed signal 20, the range of the delayed signal 21 is changed in small steps by changing the effective address of the delayed signal by an interpolation technique provided by the interpolation filter 66. Interpolation is used to reduce the larger number of storage addresses (at a correspondingly higher sampling rate $f_s$) that would otherwise be required in the storage unit 91 to create the same small range steps. The interpolation filter 66 applies different multiplying factors to each of the signals obtained from adjacent read addresses which as they are read-out from the delay storage unit 91 to obtain a plurality of products. These products are accumulated in the interpolation filter 66 to obtain a resultant signal. Changes in effective range are accomplished by changing the multiplying factors applied to the signals read-out from adjacent addresses. Thus, it is possible to change the delay (range) of an output signal 20 by taking the same group of addresses from the delay storage unit 91 and multiplying their respective read-out signals by a different set of accumulated weighting factors. The weighting factors are changed by changing the read addresses of the PROM 83 within the interpolation filter 66. The weighting factors of adjacent addresses of the PROM 83 are obtained by choosing the amplitude values of equispaced intervals of a weighting function 400 as shown in FIG. 6. The rate of change of range is determined by the amplitude change in the weighting factor applied to each signal read from the RAM 91 as determined by the extent that the weighting function 400 is effectively shifted with respect to the signals at those addresses. The weighting function 400 has a large number of weighting factors from which weighting factors are selected to be multiplied with the corresponding signals from each address read from the RAM 91. Increments in the time delay or range of the interpolated output signal 20 may be a small fraction (1/256 in the preferred embodiment) of the delay between addresses of the storage unit 91.

The delay storage unit 91 is read-out at the rate $(m+1)f_s$ which is faster than the rate $f_s$ at which information is being read into the memory from the input signal source 21. Therefore, a number m of adjacent addresses of the RAM 91 are read-out and multiplied with their respective weighting factors in the interpolation filter 66 to produce a sampled range delayed doppler signal at the output of accumulator 93 of FIG. 5.

Register 94 receives the sample created by the accumulator 93 at a clock frequency of $f_s$.

The output signal from the interpolation filter 66 is provided to the output signal conditioner 25 where the sampled digital signal is converted to a sampled analog signal in A/D converter 251. The sampled output signal of converter 251 is stored in sample and hold circuit 252 and then filtered in output filter 253. The attenuator 254 attenuates the signal of the filter to introduce an amplitude factor in the output signal 20 to reflect the reduction in amplitude of the output signal as a function of range. The computer 73 provides an attenuating signal 731 to attenuator 254 that is a function of the range.

Referring now to the delay address generator 26 of FIG. 3, the computer 66 has programmed within it the ranges and range rates as a function of time of a simulated signal as received by a hydrophone 11 from a vessel 12. Thus, the range and range rate information for a particular course of the vessel relative to the hydrophone at predetermined intervals (for example, at one quarter to one second intervals) is calculated and stored by the computer for use in updating registers 74 and 77. These computer updates are provided asynchronously at the one quarter to one second intervals to the range (delay preset) register 74 and the range rate (delay increment) register 77. At the time of update, the adder 76 has as its inputs, the P1+P3 bits of range from range register 74 via the multiplexer (MUX) 75 with strobe signal 751, and the P4 bit contents of the range rate register 77. The strobe 751 is provided by the computer 73 to strobe in the range register 74 contents at the one quarter to one second intervals. The adder 76 is activated in response to strobe signal 721 at the rate $f_s/N$. The output of the adder 76 is provided as P1+P3 bits to the output register 71 in response to the strobe signal 721 at its $f_s/N$ rate. Strobing of the adder 76 by strobe signal 721 at the rate $f_s/N$ causes the adder 76 output to increase by the P4 bit amount in the range rate in register 77. The updated range value provided by computer 73 periodically corrects any deviation of the accumulated range. The range values between updates by the computer is provided by the output register 71 incremented at the $f_s/N$ rate by the range rate in register 77. The $f_s/N$ rate signal for updating of the output register 71 is obtained by dividing the $f_s$ frequency output of clock unit 26 by N in divider 72. The output register 71 provides its P1 most significant bits (MSBs) as a coarse delay address to register 81 and its adjacent P2 lesser significant bits as a fine delay address to register 82.

The fine delay generator 24 of FIG. 3 contains the interpolation filter 66, register 89, and fine delay register 82. The register 89 provides the addresses to the filter coefficient memory (PROM) 83 of the interpolator filter 66 shown in FIG. 5. Register 89 has its P2 LSBs provided at the $f_s/N$ rate by the fine delay register 82 and its $\log_2 m$ MSBs provided at the $mf_s$ rate by the counter 85 of modulo m. Therefore, register 89 provides m addresses at a rate $mf_s$ to the PROM 83, which has $(m)2^{P2}$ addresses, each successive address being incremented by an amount $2^{P2}$ at the rate $mf_s$. Thus, the count of the counter 85 increments the MSBs of the register 89 so that the delay addresses provided to PROM 83 are incremented by $2^{P2}$ at the rate $mf_s$. The P2 output bits of the fine delay register 82 provides a number which varies between zero and $(2^{P2}-1)$ and occupies the P2 lowest order bits of register 89. The least significant bit of $\log_2 m$ bits from the counter 85 provides the number $2^{P2}$ to register 89 and the most significant number provided is $(m-1)2^{P2}$. Thus, the total range of numbers from register 89 to PROM 83 is zero to $(m)(2^{P2}-1)$. The output of register 89 increments by the number $2^{P2}$ for every increment in the output of counter 85 and this incrementing occurs at the rate $mf_s$ to provide m read addresses to PROM 83 in the time between write commands to the delay storage unit RAM 91. The addressing of the PROM 83 occurs in synchronism with the addressing of the delay storage unit 91.

The delay storage unit 91 in the preferred embodiment, is in the form of a random access memory (RAM) to which the read and write addresses and their appropriate commands are provided by the arithmetic logic unit 90. The arithmetic logic unit 90 provides a write command in response to the sampling clock $f_s$ and at the write address provided by the write counter 86. The write counter increments in response to the sampling clock frequency $f_s$ and is of modulo K, there also being K addresses in the RAM memory 91. The write address is designated by the letter "A". Thus, it is seen that the sampled signals from the input signal source 21, sampled at the frequency $f_s$, are stored in digital form in successive addresses "A" in the RAM memory unit 91. It is also seen that the RAM 91 will repeat its addresses every K pulses of the sampling clock $f_s$ and therefore store newly sampled input signals for storage. The number of addresses (K) in RAM 91 and the clock frequency $f_s$ determine the maximum delay that a simulated received signal may have.

The arithmetic logic unit 90 is also provided with a group of numbers "B" in numerical sequence from register 88. A corresponding group of read addresses "A-B" are provided by the arithmetic logic unit 90. As the write address increments at the rate $f_s$, the group "m" of read addresses will also increment at the rate $f_s$. The numbers "B" in the register 88 are provided by the adder 87 which has two inputs. One input at the rate $f_s/N$ is provided by the coarse delay register 81. The other input to the adder 87 is the count provided by counter 85 which occurs at a rate $mf_s$. Since the counter 85 is of modulo m, the register 88 output numbers "B" will provide a sequence of m addresses, the lowest address being the number provided by the coarse delay register 81 with the addresses sequentially increasing to the count of m−1 provided by counter 85. The sequence of m read addresses repeats at the rate $f_s$.

The clock 84 of frequency $mf_s$ is provided to the counter 85 of modulo m which also provides an overflow pulse $f_s$ for every $m^{th}$ pulse of clock 84. The $f_s$ overflow pulse output of counter 85 is provided to a clock 26 which provides a clock frequency $f_s$ suitable for actuating other units of the system. The arithmetic logic unit 90 selects the address A of the write counter 86 in response to clock pulse $f_s$ and causes the sampled input signal of A/D converter 223 to be written into RAM storage 91. At other times, logic unit 90 selects the read addresses A-B from register 88 which are presented to the RAM 91 at a rate $mf_s$. Thus, the information stored in m addresses in the RAM 91 is read-out from the memory 91 without interfering with the writing in of the sampled input signals at the rate of $f_s$. The number B provided by the coarse delay register 81 determines the range of the simulated delayed signal.

The interpolator filter 66 of the fine delay generator 24 is shown in FIG. 5. The interpolator filter 66 contains a filter coefficient memory 83, a multiplier 92, an accumulator 93 and a register 94. The sequential read signals provided by the RAM 91 at the m sequential addresses "A-B" are multiplied in multiplier 92 by their respective weighting factors provided by the filter coefficient memory 83. The m outputs of multiplier 92 are stored and summed in accumulator 93 to provide an output signal at the termination of the m pulses. The memory 83 may be in the form of a programmable read-only memory (a PROM) having $m2^{P2}$ addresses, each storing a predetermined numerical value. The graph of FIG. 6 represents a typical weighting function 400 showing the distribution of the weighting factors in the various addresses of the PROM 83. The weighting function 400 is shown with eight (m=0, 1, . . . , 7) regions, each region having 256 addresses (for P2=8), with a weighting factor distribution. The PROM 83 has $m2^{P2}=2048$ addresses in which 256 weighting factors in each of eight regions are stored. If P2 is equal to eight bits, zeros of the weighting function will occur at addresses of the PROM corresponding to 0, 256, 512, . . . , 2048 except for address 1024 where the weighting factor is unity. There are eight regions between these addresses where the weighting factor is other than zero or unity as determined from the weighting function. Addresses 891 are sequentially presented to PROM 83 by register 89 whose value is $m(2^{P2}-1)$ plus the value 821 in fine delay register 82.

As an example of the freedom from undesired frequency components of the doppler shifted signal output of the doppler simulator of this invention, the following is presented: For the case where the input is a single frequency $f(t)=\sin 2\pi \times 2048t$, $\dot{R}_{max}=90$ knots, minimum time delay resolution is (P2=5 bits), utilizing minimum update time (N=1 in Table 1), with an eight tap interpolation filter (m=8) where the tap coefficients (or weighting function 400) were determined by multiplying the Hanning Window function $\cos^2(x/m)$ with the $(\sin x)/x$ function, the highest side lobes were at least 40 db below the doppler signal of interest.

Multichannel Embodiment of the Invention

Figure 7:
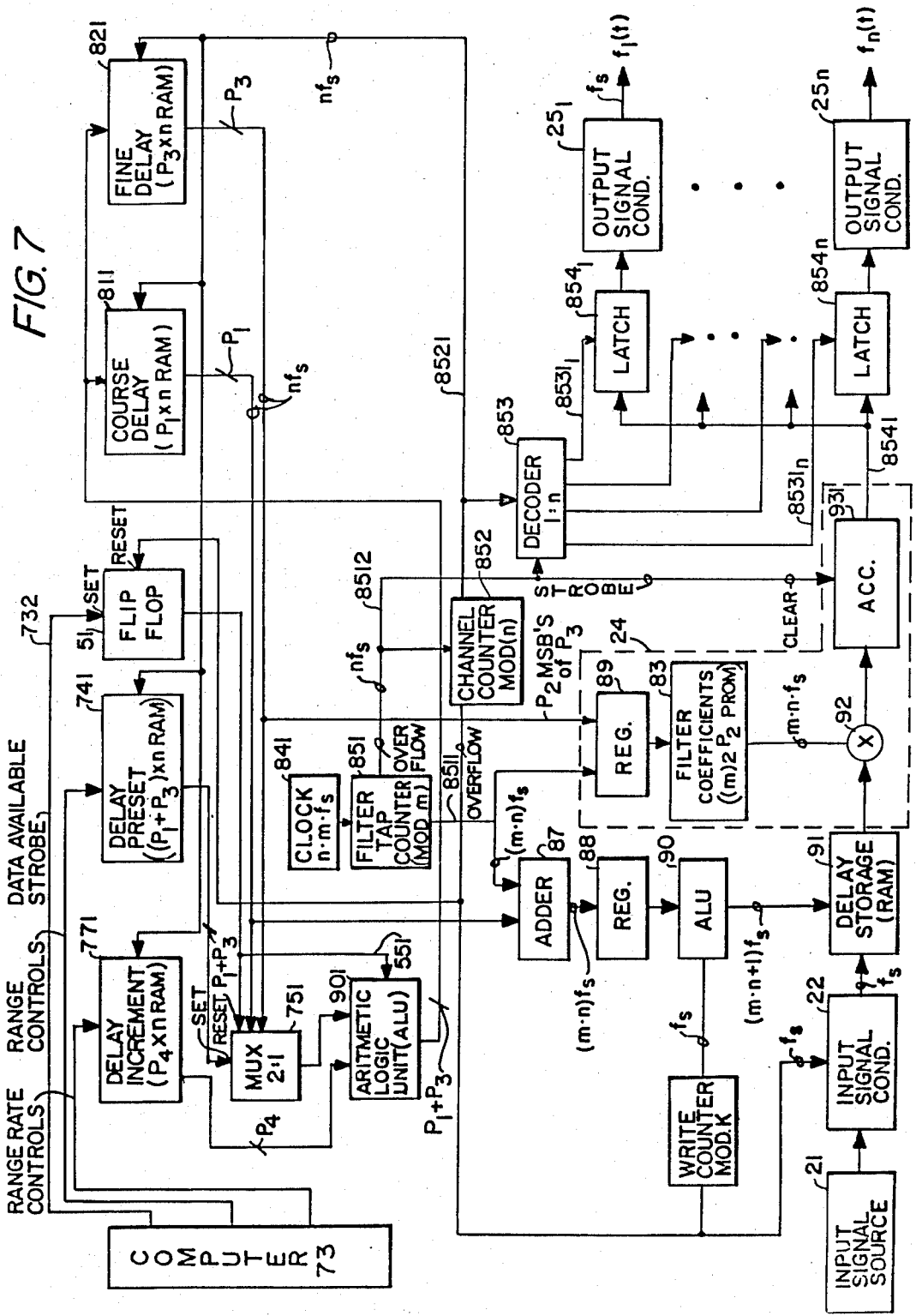
FIG. 7 is a block diagram of an embodiment of the invention for providing multiple signal outputs, each output providing its independent doppler-shifted, range-delayed signal corresponding to signals received by each hydrophone in a field.

The simulation advantages of this invention are much more significant for the multichannel application where a plurality (n) of output signals of different ranges and doppler shifted frequencies are provided. The block diagram for providing multichannel output signals is shown in FIG. 7. The time delay and delay-increment words provided by computer 73 to registers 74, 77, respectively of FIG. 3 are expanded into multiple (n) words which are stored in memories 741 (an n×(P1+P3) RAM), 771 (an n×P4 RAM), respectively. The fine delay register 82 and the coarse delay register 81 are replaced with memories 821 (an n×P3 RAM) and 811 (an n×P1 RAM), respectively. The memories 811, 821 are time multiplexed over the n channels as is the arithmetic logic unit 901. The timing is altered to read the interpolation filter 83 and the memory RAM 91 at a faster (m.n+1) $f_s$ rate rather than at the m.$f_s$ rate so that the m addresses of each of the n channels can be read-out of the memory RAM 91 in the time $1/f_s$ between write intervals. The fine delay generator 24 interpolation is time multiplexed over the n channels. Multiple output registers or latches 854 and digital/analog converters (if desired) in signal conditioner 25 provide the n channel output signals $f_n(t)$. Attenuators (not shown) in conditioner 25 responsive to signals 731n from computer 73 provide for separate aspect and propagation path losses.

The flip flop (FF) 51 is set by a DATA AVAILABLE STROBE 732 from computer 73 which senses that its new data has been transferred into the memories 771 and 741.

Setting of FF 51 causes the MUX 751 to sequentially provide the (P1+P3) bits stored in each of the n addresses of RAM 741 to the ALU 901 and to provide a SET pulse on line 551 to ALU 901 which inhibits the P4 bits of RAM 771 from being added to the (P1+P3) bits of RAM 741. This provides a sequence of n addresses of P1 data to the coarse delay RAM 811 and a sequence of n addresses of P3 data to the fine delay RAM 821.

The RAMS 771, 741, 811 and 821 have their addresses incremented at the rate $nf_s$ so that the ALU receives n different ranges each $1/f_s$ seconds from either the RAMS 771, 741 or from the RAMS 771, 811 and 821 depending upon the SET or RESET condition of FF 51, respectively. The coarse delay RAM 811 provides P1 bits at the rate $nf_s$ and the fine delay RAM 821 provides P3 bits at the rate $nf_s$.

The flip flop 51 is RESET by the first $f_s$ clock pulse after the n addresses of the RAM 741 have been read into the ALU 901 via MUX 751. Resetting of FF 51 provides a signal on line 551 to ALU 901 which removes the inhibiting action required on the P4 bits from delay increment RAM 771 during the new range update from RAM 741.

The n channel outputs of the coarse delay RAM 811 and the fine delay RAM 821 provided at the rate $nf_s$ are incremented by their respective range increments from range increment RAM 771 in ALU 901 and provided back to the n inputs P1 of coarse delay RAM 811 and P3 of fine delay RAM 821.

A clock 841 provides a clock frequency of $nmf_s$ which is provided to filter tap counter 851, of modulo m, which provides an output count on line 8511 of 0 to m−1 at the $nmf_s$ rate. An overflow count on line 8512 provides one pulse every m counts of counter 851 (at a rate $nf_s$). The pulses on line 8512 clock channel counter 852 of modulo n. The count of 0 to n−1 from counter 852 is provided on line 8521 as the n addresses of RAMS 771, 741, 811 and 821; and is also provided to a decoder 853 where it switches the strobe pulse input signal on line 8512 at frequency $nf_s$ to one of the output lines 85311, 85312, . . . , 8531n in accordance with the value of the count on line 8521. The pulses on each of the lines 85311, . . . , 8531n occurs at different $1/nf_s$ times each at the rate $f_s$ and actuate the latch 854 to which it is connected. The line 8541 is connected to the inputs of the latches 854 and to the output of the accumulator 931 which provides n channel summed signals occurring sequentially at a rate $nf_s$ on line 8541 to the latches 854 where they are demultiplexed to provide n separate channel signals at the latch 854 outputs.

The n channel outputs of RAM 811 are provided at rate $nf_s$ as a number 0 to $(2^{P1}-1)$ to adder 87. The other input to adder 87 is the count of counter 851 which provides the number (0 to m−1) at the rate $nmf_s$. The output of adder 87 is provided to a register 88 where the output of adder 87 is stored and provided to ALU 90 at the rate $nmf_s$. Thus, each of the n channels provides an address of a delayed signal every $1/mf_s$ seconds which is incremented by 0 to (m−1) every $1/nmf_s$ seconds to thereby increment sequentially over m addresses for each channel. Thus, the input rate of read addresses to ALU 90 from register 88 is $nmf_s$. The ALU 90 also has a count input for a write address from write counter 86 at a rate $f_s$. The addresses at the output of the ALU 90 are provided at the rate $(mn+1)f_s$ to the Delay Storage RAM 91. The ALU 90 output provides the sequentially incremented m read addresses of register 88 for each of the n channels and also the write address of write counter 86, each address being in sequence.

The register 89 has an input line 8511 from filter tap counter 851, of modulo m, which provides a sequential number (0 to m−1) to register 89 at a rate $nmf_s$. Register 89 also has an input from fine delay RAM 821 which provides one number (0 to $2^{P2}-1$) from the P2 most significant bits of P3, provided by RAM 821 at the rate $nf_s$. The output of register 89 therefore is a group of m addresses incremented in sequence, followed by a second group of m addresses in sequence with the next nth channel data, and so on for all n channels. Thus, the rate of addresses provided by Register 89 to the filter coefficient PROM having $m2^{P2}$ addresses is $m.nf_s$.

The input signal from source 21 is applied to the signal conditioner 22 where it is filtered, sampled and held, and A/D converted at an $f_s$ sample rate. The output of the signal conditioner 22 is written into the RAM 91 at the (0 to K) addresses provided by the write counter 86, of modulo K, through the ALU 90 at the $f_s$ rate.

The sampled signals stored in RAM 91 are read-out at each sequence of m addresses for each of the n channel addresses provided by ALU 90. The weighting factors stored in the PROM 83 are read-out at each sequence of m addresses for each of the n channels. The signals from RAM 91 and PROM 83 occur in time coincidence at the rate $nmf_s$ and are multiplied in multiplier 92. Each group of m products of each of the n channels is summed in accumulator 931 which is cleared after each group is summed by a clear pulse on line 8512 which occurs at the $nf_s$ rate so that the output of the accumulator provides in sequence the accumulated value of the products of the multiplier 92 for each of the n channels.

The accumulated value of each of the n channels at the output of accumulator 931 is provided as an input to each of the latches 854. The latch signals 85311, ..., 8531$_n$, provided by the decoder 853 demultiplexes the output of accumulator 931 and latches a sampled signal from one of the n channels to one of the n latches 854 in sequence. Each one of the n latches 854 receives sampled signals from only one of the n channels at the rate $f_s$. The output signal of each latch 854 is provided to its respective signal conditioner 25 where the signal is D/A converted, sampled and held at the $f_s$ rate, and filtered to provide n channel signals, each of which are substantially the same as the input signal, but delayed in time and doppler shifted with respect to the input signal, the delay time being independent for each of the n channels.

Having described a preferred embodiment of the invention, it will now be apparent to one of skill in the art that other embodiments incorporating its concept may be used. It is felt, therefore, that this invention should not be limited to the disclosed embodiment, but rather should be limited only by the spirit and scope of the appended claims.

What is claimed is:
1. A doppler shift simulator circuit comprising:
a source of a signal;
means for sampling at a sampling frequency said signal to provide a sequence of sampled signals;
means for sequentially storing said sampled signals in a sequence of consecutive locations in a delay medium;
means sequentially reading out said sampled signals from said delay medium at a rate m times that of the sampling frequency, m being an integer greater than one, from a plurality of adjacent locations relative to a preselected location corresponding to range in said delay medium;
means for storing a plurality of weighting factors in a memory;
means for multiplying at a rate "m" times that of the sampling frequency selected ones of a set of said plurality of weighting factors with "m" said sequentially read-out stored sampled signals from said reading-out means, respectively, to provide a plurality of products;
said selected weighting factors being a different set for each plurality of products;
means for accumulating said products to provide a sum signal;
means for providing at each of a plurality of later sampling frequency times "m" different selected ones of said plurality of weighting factors from said storing means at "m" times the sampling frequency to said multiplying means to provide a plurality of different products with said sequentially read-out stored sampled signals;
said accumulating means providing a different sum signal at each of said plurality of later times to form time sequential sampled signals at the sampling frequency; and
means for filtering said time sequential sum signals to provide a delayed signal output having a doppler shift with respect to said source signal, the magnitude of said doppler shift being dependent upon the magnitude of the change of the weighting factor from set to set applied to a read-out storage location at sequential read outs at the sampling frequency.
2. A doppler simulator circuit comprising:
an input signal source;
means for sequentially sampling said signal at a sampling frequency $f_s$ to provide a sequence of sampled signals;
means for sotring said sequentially sampled signals in a plurality of serially sequential locations, respectively, in a first memory;
means for sequentially reading-out at a frequency $mf_s$ where one is an integer greater than one a selected group of said m sampled signals from said first memory;
means for storing a plurality of weighting factors in a second memory, each weighting factor being at a predetermined locations;
means for multiplying selected "m" ones of a set of said plurality of weighting factors with selected "m" ones of said serial sequence of stored sampled signals from said read-out means, respectively, to serially provide a plurality of products;
means for accumulating said products to provide a sum signal;
means for providing at a plurality of subsequent times different selected ones of a different set of said plurality of weighting factors from said second memory to said multiplying means to provide a plurality of different products with the said selected ones of said serial sequence of stored signals;
said accumulating means providing a different serial sequence of different sum signals for each of said plurality of products at said plurality of subsequent times; and means for filtering said sequential sum signals from said accumulating means to provide a time delayed signal output having a doppler shift with respect to said input signal.

3. A range-delayed and doppler-shifted signal simulator comprising:

a signal source (21);

means (26) for providing a clock pulse at rate $f_s$;

means (222) for sampling said signal at said clock pulse means for producing incremented write addresses in response to said clock pulses;

first means (223) for storing said sampled signal connected to said sampling means (222), each at its own address provided by said write address means;

means (77) for providing a range rate number;

means (74) for providing a range number;

an adder (76);

a source (72) of strobe pulses;

means (75) for selectively repetitively adding said range rate number to said range number in said adder in response to said strobe pulses;

second means (71) storing the output of said adder;

a coarse delay register (81);

a fine delay register (82);

said second storing means (71) providing an output number comprising a number comprising most significant bits and least significant bits to registers 81, 82, respectively;

means (85) for providing a sequentially increasing number of modulo m at a rate $mf_s$;

means (87) for adding said most significant bits of said output number from register (81) and said sequentially increasing numbers of modulo m from means (85) to produce a first sequence of m incremented numbers forming a first sequence of read addresses;

means (89) for adding said least significant bits of said said first read address number from register (82) to sequentially increasing numbers from means (85) to produce a second sequence of m incremented numbers forming second read addresses;

means (90) for alternately presenting said write addresses and said first sequence of said read addresses to said first storing means;

a third storing means (83) for storing a plurality of multiplier numbers at different addresses of said third storing means;

means (89) for providing said second sequence of m incremented numbers as read addresses to said third storing means (83);

means (92) for multiplying the m read outputs of said first (91) and third (83) storing means from said first and second sequences of m read addresses applied to each said storing means from means (90) and (89), respectively, to provide a plurality m of products;

means (93) accumulating the m products of means (92) to obtain a sum signal, said adding means providing a sequence of different sum signals at the clock rate $f_s$;

means filtering said sequence of sum signals to provide a simulated signal; and said simulated signal being delayed in time and doppler shifted with respect to the signal from said source (21) by an amount corresponding to said range and range rate numbers, respectively.

4. A doppler shift simultor circuit comprising:

a source of a signal;

means sampling at a sampling frequency said signal to provide a sequence of sampled signals;

a delay medium;

means for sequentially storing said sampled signals in a sequence of locations in a delay medium;

means sequentially reading out a group "m", "m" being greater than one, of sampled signals in adjacent locations in said delay medium;

means modifying the amplitude of each of said read-out sampled signals in a predetermined manner each modified amplitude being provided at a rate "m" times the sampling frequency;

means summing at the sampling frequency the modified amplitude of the read-out "m" locations in memory to provide a sequence of sum signals at the sampling frequency;

said modifying means producing a different amplitude at a data sampling frequency rate of each one of said "m" sampled signals to thereby cause the sum signal to be different on each summation;

means filtering said sequence of sum signals to cause the filtered succession of sum signals to have a doppler shift and delay with respect to said source signal.

* * * * *